United States Patent Office 3,573,080
Patented Mar. 30, 1971

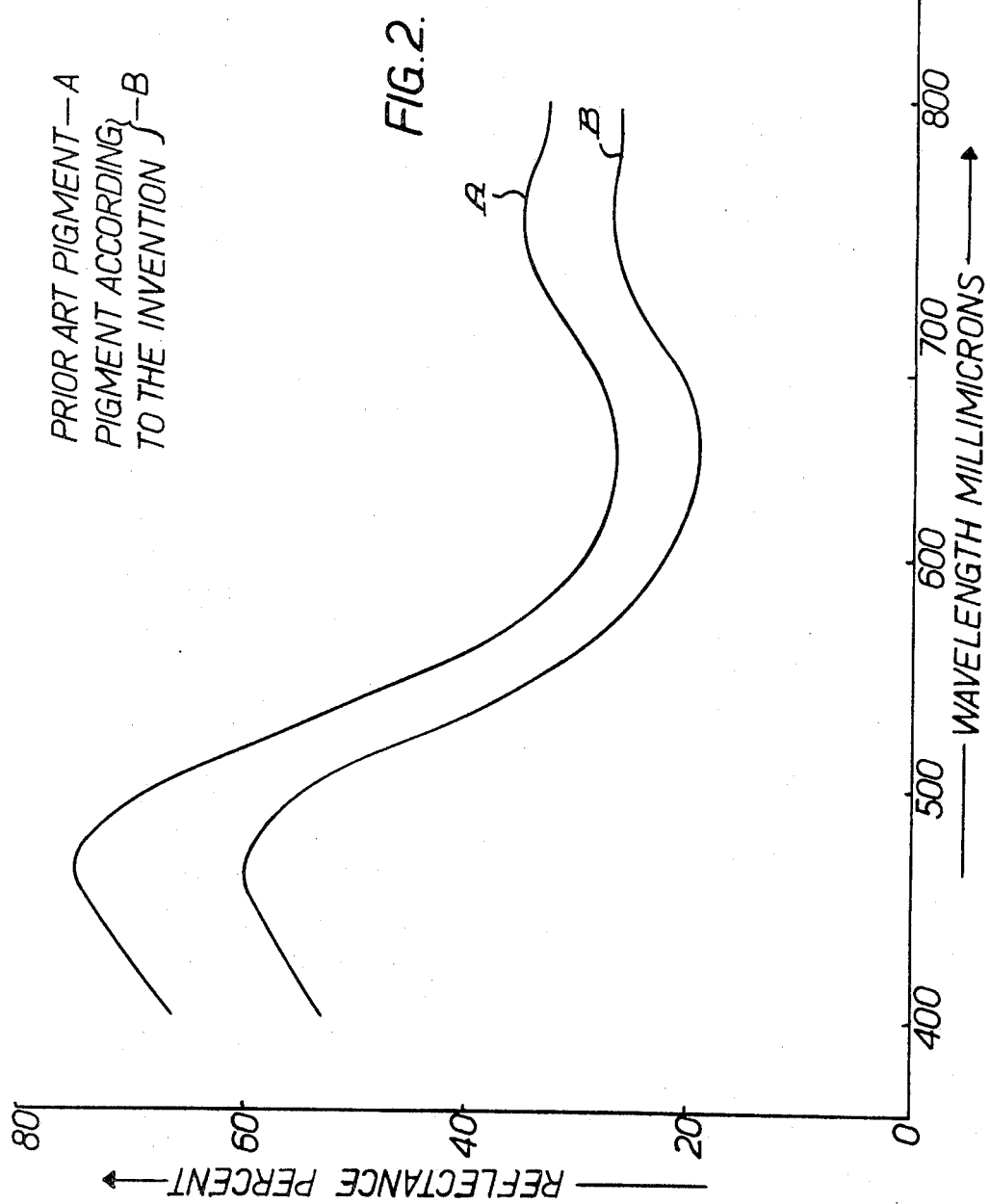

3,573,080
CERAMIC PIGMENTS
Bernard Trevor Bell and William D. J. Evans, London, England, assignors to Johnson, Matthey & Co. Limited, London, England
Filed June 7, 1968, Ser. No. 735,337
Claims priority, application Great Britain, June 9, 1967, 26,773/67
Int. Cl. C09c 1/00
U.S. Cl. 106—299
14 Claims

ABSTRACT OF THE DISCLOSURE

A zircon-based ceramic pigment prepared by calcining a mixture of zirconium oxide and silicon oxide in the presence of a chromophore and one or more mineraliser components in which the mineraliser components comprise a source of barium ions and a source of sulphate ions in addition to sources of alkali metal ions, fluoride ions and either chloride or bromide ions.

---

Figure 1:
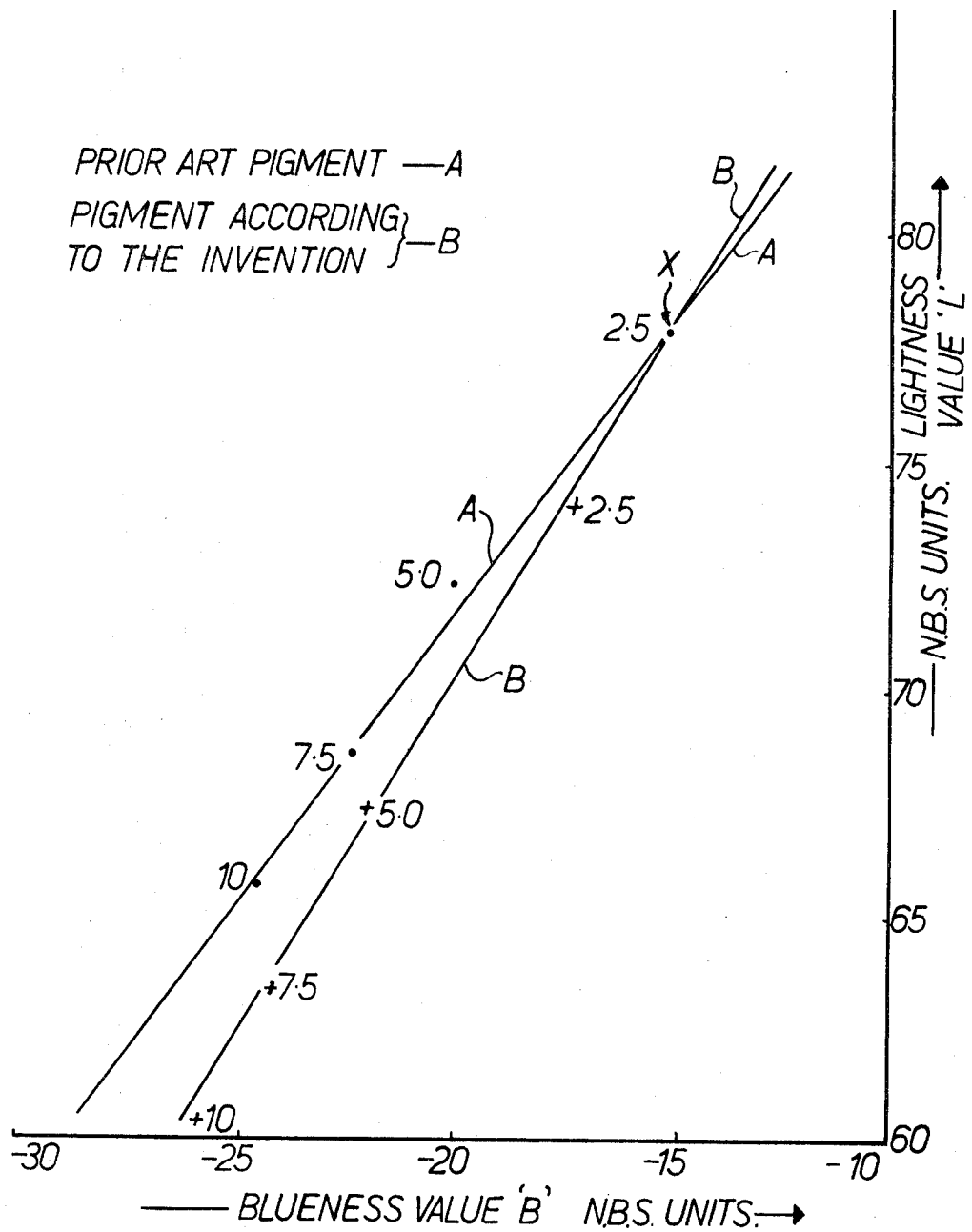

The invention is concerned with improvements in and relating to ceramic pigments.

A zircon-based ceramic pigment may be prepared by calcining a mixture comprising zirconium oxide and silicon oxide (or compounds capable of yielding these oxides on calcination) in the presence of a chromophore and one or more mineraliser components, the proportions of zirconium oxide and silicon oxide in the mixture being such that zirconium silicate is formed on calcination.

A chromophore is a material one or more components of which impart(s) colour to the calcined material. For example, the chromophores in blue and yellow zircon-based ceramic pigments are the oxides of vanadium and praseodymium respectively. Compounds which yield such oxides on calcination are often employed in the calcination mixture.

It is known that zirconium silicate containing at least part of the chromophore is formed when mixtures of the above type are calcined. The colour strength of the ceramic pigment obtained is dependent on the relative amount of chromophore incorporated in the zircon lattice. This in turn is dependent upon the mineraliser component or components used in the calcination mixture.

It is known, for example, that strongly coloured blue and yellow pigments may be formed by calcining mixtures of the type described above in which the colouring agents are, respectively, vanadium pentoxide and praseodymium oxide and in which, in each case, mineraliser components comprising sources of alkali metal ions, fluoride ions and either chloride or bromide ions are employed.

We have now discovered that a ceramic pigment of still further enhanced colour strength may be formed by calcining a mixture of the type described above, in which, the mineraliser components comprise, a source of barium ions and a source of sulphate ions in addition to sources of alkali metal ions, fluoride ions and either chloride or bromide ions.

In particular, we have discovered that a strongly blue-coloured ceramic pigment may be prepared by calcining at a temperature within the range 750° C. to 1150° C. a mixture comprising zirconium and silicon oxides, one or more compounds capable on calcination of yielding vanadium pentoxide and compounds which constitute sources of alkali metal ions, barium ions, sulphate ions, fluoride ions and chloride ions.

Preferably, the total content of the three oxides, zirconium oxide, silicon oxide and vanadium pentoxide, in the mixture lies between 35 and 98% by weight of the said mixture. The proportions of zirconium oxide, silicon oxide and vanadium pentoxide in the mixture may lie within the ranges 35 to 80 wt. percent; 10 to 55 wt. percent and 1 to 12 wt. percent, respectively of the total content of these oxides in the mixture. Preferably, however, the amounts of zirconium and silicon oxides present in the mixture are stoichiometric to zirconium silicate.

Conveniently sodium chloride, sodium sulphate and barium fluoride are used as the sources of alkali metal, chloride, sulphate, barium and fluoride ions, and preferably these compounds are present in the calcination mixture in such proportions that they constitute respectively 1%–20%, 0.5%–35% and 0.5%–10% by weight of the mixture.

A ceramic pigment according to the invention is typically obtained by calcining at approximately 860° C. in an open (i.e., vented) saggar, a dry-mixed composition consisting of 60 gm. zirconium oxide, 30 gm. silica, 5.5 gm. ammonium metavanadate, 2.5 gm. barium fluoride, 10 gm. sodium sulphate, and 10 gm. sodium chloride. The crushed ground and washed produce is a strong blue ceramic pigment.

It is known to prepare a blue ceramic pigment by calcining at approximately 860° C. in a closed saggar a mixture of 60 gm. zirconium oxide, 30 gm. silica, 5.5 gm. ammonium metavanadate, 5 gm. sodium fluoride and 4 gm. sodium chloride and, thereafter, crushing, grinding and washing the calcination product.

The use of an open, as opposed to a closed, saggar in the manufacture of a pigment according to the invention enables a pigment of higher colour strength to be obtained. The converse is true in the case of the known pigment. In this case the use of a closed saggar yields better results. The methods just described of making, respectively, a pigment according to the invention and a known pigment are therefore those that, in each case, yield pigments of higher colour strength. As shown below, the colour strength of the pigment according to the invention is significantly higher than that of the known pigment when both are made under these optimum conditions. We have also found that the pigment according to the invention, even when made by calcining the mixture in a closed saggar (that is, under conditions below the optimum) has an appreciably higher colour strength than the known pigment made under optimum conditions in a closed saggar.

In order to illustrate the enhanced colour strength of ceramic pigments in accordance with the invention, samples of a prior art blue pigment and the pigment according to the invention, both prepared in the manner described above, were mixed respectively with samples of a white, zircon opaque glaze maturing at 1070° C. at 2.5%, 5%, 7.5% and 10% concentrations. The pigmented glaze samples were then applied to and fired on white ceramic tiles.

Reflectance measurements on the glazed tiles in the red (R), green (G) and blue (B) regions of the spectrum were then obtained with a Colormaster differential colorimeter. In each case, in order to eliminate directional effects due to surface defects, the average of two reflectance measurements taken at right-angles to one another (that is with the glazed tile turned through 90° between measurements) was taken as the basis for the subsequent computation of modified Adams Co-ordinates.

The reflectance measurements R, G, and B together with the modified Adams Co-ordinates "L," "a" and "b" derived from the reflectance measurements are set out in the table below. In this table, "B" refers to the pigment according to the invention and "A" to the known pigment.

|   | 10 percent | | 7.5 percent | | 5 percent | | 2.5 percent | |
|---|---|---|---|---|---|---|---|---|
|   | B | A | B | B | B | A | B | A |
| G | 30.42 | 36.95 | 34.34 | 40.93 | 39.39 | 46.40 | 49.38 | 55.37 |
| R | 22.65 | 28.38 | 26.39 | 32.40 | 31.37 | 38.03 | 41.84 | 47.90 |
| B | 51.67 | 59.41 | 55.68 | 62.79 | 59.97 | 66.87 | 67.36 | 72.05 |
| L | 60.32 | 65.57 | 63.55 | 68.5 | 67.38 | 72.25 | 74.18 | 77.84 |
| a | −7.2 | −7.3 | −7.2 | −7.5 | −7.2 | −7.3 | −6.5 | −4.2 |
| b | −25.6 | −24.4 | −24.2 | −22.3 | −21.9 | −20.0 | −17.2 | −15.1 |

The Adams Co-ordinate "L" represents the lightness value of the glaze colour on a scale ranging from black to white; the co-ordinate "a" represents the redness or greenness of the sample, positive values of "a" signify redness and negative values greenness; the co-ordinate "b" represents the blueness or yellowness, positive values of "b" signifying yellowness and negative values blueness. The units in each case are N.B.S. units where 0.3 N.B.S. units is the minimum difference in hue or lightness detectable by a trained observer.

Inspection of the lightness values shows that in each case the "L" values of coloured glazes containing the prior art pigment are greater than the corresponding "L" values for those containing the new material, i.e. the pigment prepared according to this invention is stronger than the known pigment.

Inspection of the blueness values shows that in every case the "b" values of coloured glazes containing the known pigment are less negative than those containing the pigment of the invention, that is, the latter pigment is bluer than the known pigment. Consequently, since the greeness values "a" of these trials are similar except at the lowest concentration, the pigment of the invention is superior in all respects to the known pigment.

This conclusion is confirmed by FIG. 1 which shows a plot of the lightness values against the blueness values "L" of the coloured glazes containing pigments according to the invention (B) and according to the prior art (A) respectively. It may be seen that the pigment prepared according to the invention and the known pigment are of slightly different hue. The difference decreases with increasing pigment concentration, the glazes containing the pigment of the invention being stronger and bluer than those containing the known pigment. At point X the glazes containing the respective pigments have the same "L" and "b" values and the colours would have been a perfect match had the "a" values differed by less than 0.3 N.B.S. units. It is evident, however, that at point X a coloured glaze containing approximately 2.5% of the known pigment would be matched by a glaze containing only approximately 1.5% of the pigment prepared according to the invention. Thus, the new pigment is approximately 65% stronger than the known pigment. Similar results are obtained by comparison of coloured glazes having the same "L" value.

The colorimeter measurements are confirmed by the spectral reflectance curves of FIG. 2 which show a colour comparison between the known zircon vanadium blue pigment and the pigment according to the invention. These curves were obtained with a Unicam SP500 spectrophotometer using tiles previously used for the colorimeter measurements and coated with a glaze containing 10% of the appropriate pigment.

The curves are representative of the pigments of the two samples recorded in terms of percentage reflectance against wavelength. It should be noted that although the curves are similar in shape, the reflectance of the glaze containing the new pigment is lower, at all wavelengths, than that containing the known pigment. That is, the new pigment has a greater tinctorial strength than the known pigment.

We claim:
1. In a method of making a zircon-based ceramic pigment including calcining a mixture of zirconium oxide and silicon oxide in the presence of a vanadium chromophore and a mineralizer, the proportion of zirconium oxide and silicon oxide in the mixture being such that zirconium silicate is formed on calcination, the improvement which involves using as the mineralizer, a mixture consisting essentially of sources of barium, sulphate, alkali metal, fluoride and a member of the group consisting of chloride and bromide ions.

2. A method according to claim 1 including calcining at a temperature within the range 750° C. to 1150° C., a mixture comprising zirconium oxide, silicon oxide, at least one compound capable on calcination of yielding vaandium pentoxide, the total content of zirconium oxide, silicon oxide and vanadium pentoxide in the mixture constituting 35 to 98% by weight of the mixture and sources of alkali metal ions, barium ions, sulphate ions, fluoride ions and chloride ions.

3. A method according to claim 2 wherein the proportions of zirconium oxide, silicon oxide and vanadium pentoxide in the mixture may lie within the ranges 35 to 80 wt. percent; 10 to 55 wt. percent and 1 to 12 wt. percent, respectively of the total content of these oxides in the mixture.

4. A method according to claim 1 wherein the amounts of zirconium and silicon oxides present in the mixture are stoichiometric to zirconium silicate.

5. A method according to claim 1 wherein the source of chloride ions is sodium chloride.

6. A method according to claim 1 wherein the source of sulphate ions is sodium sulphate.

7. A method according to claim 1 wherein the source of fluoride ions is barium fluoride.

8. A method according to claim 5 wherein sodium chloride, sodium sulphate and barium fluoride are present in the calcination mixture in the proportions 1–20%; 0.5–35% and 0.5–10% by weight of the mixture respectively.

9. A method according to claim 2 wherein calcination is carried out at a temperature of 860° C. in an open saggar.

10. A zircon-based ceramic pigment when made in accordance with the method claimed in claim 1.

11. A zircon-based ceramic pigment consisting essentially of a calcined product of a mixture of zirconium oxide and silicon oxide, a vanadium oxide chromophore, and a mineralizer component consisting essentially of sources of barium, sulphate, alkali metal and fluoride ions and a member of the group consisting of chloride and bromide ions, said pigment being characterized by its enhanced color strength.

12. The pigment of claim 11 wherein the proportions of zirconium oxide, silicon oxide and chromophore oxide are within the ranges 35–80%; 10–55% and 1–12%, respectively, by weight, based on the total content of these oxides in the mixture and the mineralizer component consists essentially of alkali metal chloride, alkali metal sulphate and barium fluoride in amounts such that they constitute, respectively, 1–20%, 0.5–35% and 0.5–10% by weight of the mixture calcined.

13. A composition useful for preparing a zircon-based ceramic pigment of enhanced color strength by calcining, said composition comprising a mixture of zirconium oxide and silicon oxide in amounts such that zirconium silicate is formed on calcination, a vanadium oxide chromophore and a mineralizer component consisting essentially of sources of barium, sulphate, alkali metal and fluoride ions and a member of the group consisting of chloride and bromide ions, the proportions of zirconium oxide, silicon oxide and chromophore oxide constituting, respectively, 35–80%, 10–55% and 1–12% by weight of said composition.

14. A composition according to claim 13 wherein said mineralizer component is a mixture of alkali metal chloride, alkali metal sulphate and barium fluoride in amounts such that they constitute, respectively, 1–20%, 0.5–35% and 0.5–10% by weight of the composition.

References Cited

UNITED STATES PATENTS

| | | | |
|---|---|---|---|
| 2,992,123 | 7/1961 | Seabright | 106—299 |
| 3,012,898 | 12/1961 | Seabright | 106—299 |
| 3,025,178 | 3/1962 | Seabright | 106—299 |
| 3,257,221 | 6/1966 | Olby | 106—299 |
| 3,189,475 | 6/1965 | Marquis et al. | 106—299 |
| 3,166,430 | 1/1965 | Seabright | 106—299 |

FOREIGN PATENTS

| | | | |
|---|---|---|---|
| 669,928 | 1/1966 | France | 106—299 |

H. M. S. SNEED, Assistant Examiner

TOBIAS E. LEVOW, Primary Examiner